(12) United States Patent
Allieta et al.

(10) Patent No.: US 8,622,349 B2
(45) Date of Patent: Jan. 7, 2014

(54) DEVICE FOR ASSISTING THE PILOTING OF A ROTORCRAFT

(71) Applicant: EUROCOPTER, Marignane Cedex (FR)

(72) Inventors: Jean-Marie Allieta, Gardanne (FR); Bruno Chaduc, Eguilles (FR); Jean-Francois Laffisse, Marseilles (FR); Olivier Honnorat, Aix En Provence (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 13/691,927

(22) Filed: Dec. 3, 2012

(65) Prior Publication Data

US 2013/0087660 A1    Apr. 11, 2013

Related U.S. Application Data

(62) Division of application No. 12/814,687, filed on Jun. 14, 2010, now Pat. No. 8,342,455.

(30) Foreign Application Priority Data

Jun. 16, 2009  (FR) ...................... 09 02913

(51) Int. Cl.
*G05D 1/00* (2006.01)
(52) U.S. Cl.
USPC ...................................... 244/194; 244/17.13

(58) Field of Classification Search
USPC ................. 244/17.11, 17.13, 17.25, 194, 195
See application file for complete search history.

(56) References Cited

U.S. PATENT DOCUMENTS

| 4,345,195 A | 8/1982 | Griffith et al. |
| 5,489,830 A | 2/1996 | Fernandez |
| 6,334,592 B1 | 1/2002 | Tomio et al. |
| 7,108,232 B2 | 9/2006 | Hoh |
| 7,229,046 B2 | 6/2007 | DuRant |

FOREIGN PATENT DOCUMENTS

| EP | 1037130 A2 | 9/2000 |
| FR | 2708112 A1 | 1/1995 |
| WO | 2005002963 A2 | 1/2005 |

OTHER PUBLICATIONS

Search Report and Written Opinion; Application No. FR 0902913; dated Mar. 18, 2010.

*Primary Examiner* — Timothy D Collins
*Assistant Examiner* — Jamie S Stehle
(74) *Attorney, Agent, or Firm* — Brooks Kushman P.C.

(57) ABSTRACT

A device for assisting the piloting of a rotorcraft, the rotorcraft having a flight control (10) for controlling a rotor (20, 21) via at least one linkage (35. An additional force is generated by at least one piloting assistance means (100) mechanically linked to the linkage (35. The additional force is a function of the position of the flight control (10) and of an instantaneous force as measured on the linkage (35).

20 Claims, 3 Drawing Sheets

DEVICE FOR ASSISTING THE PILOTING OF A ROTORCRAFT

CROSS-REFERENCE TO RELATED APPLICATIONS

This application is a divisional of U.S. Ser. No. 12/814,687, filed Jun. 14, 2010, which claims priority to French Patent Application No. FR 0902913 dated Jun. 16, 2009, the disclosures of which are incorporated in its entirety by reference herein.

FIELD OF THE INVENTION

The present invention relates to a device for assisting the piloting of a rotorcraft, and in particular a helicopter.

BACKGROUND OF THE INVENTION

Conventionally, a rotorcraft commonly includes a main lift rotor provided with a plurality of blades.

The blades of the main lift rotor describe a very flat cone having a plane of rotation that is perpendicular to the general lift generated by said main rotor. This general lift of the main rotor may then be resolved into a vertical lift force proper and a horizontal force that serves to cause the helicopter to move in translation. Consequently, the main rotor does indeed provide the rotorcraft with lift.

In addition, on a helicopter, by controlling the shape and the tilt of said cone relative to the frame of reference of the helicopter, a pilot can control the advance of the helicopter and direct it accurately.

In order to act on the cone, the blades are caused to flap so as to modify their angle of inclination relative to the drive plane of the main rotor, said drive plane being perpendicular to the mast of the main rotor. By varying the pitch of a blade, the lift it generates is varied, thereby causing the flapping of said blade to vary.

Consequently, the helicopter is provided with specific means for causing the pitch of each blade to vary, and consequently for varying the aerodynamic angle of attack of each blade relative to the incident stream of air through which the blade passes.

In order to control the general lift of the main rotor, both in magnitude and in direction, the helicopter pilot thus acts generally on the value of the pitch angle of each blade by causing the blade to turn about its longitudinal pitch axis. Thus, when the pilot orders a collective variation of pitch, i.e. an identical variation in pitch for all of the blades, the pilot causes the magnitude of the lift generated by the main rotor to vary, thereby controlling the altitude and the speed of the helicopter.

In contrast, collective pitch variation has no effect on the direction of this general lift.

In order to modify the direction of the general lift generated by the main rotor, it is necessary to incline said cone by varying pitch in a manner that is not collective, but rather that is cyclic. Under such circumstances, the pitch of a blade varies as a function of its azimuth angle and during one complete revolution it passes between a maximum value to a minimum value that are obtained at opposite azimuth angles.

Cyclic variation of the pitch of the blades gives rise to cyclic variation in the lift from the blades and thus to variation in the angle of inclination of the cone. By cyclically varying the pitch of the blades, the pilot controls the attitude of the aircraft and its movement in translation.

The pilot's pitch flight controls, a collective pitch lever and a cyclic stick, are generally connected to the blades via mechanical connections known as "linkages", which linkages are secured to the non-rotating plate of a cyclic swashplate. The rotating plate of the cyclic swashplate is mechanically connected to each blade via a respective pitch control rod.

More precisely, primary roll and pitch linkages connect the cyclic stick to a mixer, the mixer being connected to the non-rotary plate of the cyclic swashplate by secondary linkages. In addition, the collective pitch lever is connected to the mixer via a collective primary linkage. Under such circumstances, a flight control is connected to a rotor via a roll and pitch linkage or collective linkage, both of which are provided in succession with a primary linkage and a secondary linkage.

A movement of the cyclic stick causes the primary roll or pitch linkage to move and consequently causes the corresponding secondary linkage(s) to move via the mixer.

In contrast, a movement of the collective pitch lever gives rise to a movement of the collective primary linkage and then of the secondary linkage via the mixer.

Nevertheless, since the forces that need to be exerted are large, a servo-control is generally made available in each secondary linkage. For example, in a light helicopter, there is provided in principle one servo-control for pitch control, referred to as the "pitch servo-control" for convenience, and two servo-controls for roll to left and to right for piloting in roll.

When the pilot seeks to modify the collective pitch of the blades, action on the collective lever causes all three servo-controls to raise or to lower the cyclic swashplate as a whole, i.e. both the non-rotary plate and the rotary plate of the cyclic swashplate.

The pitch control rods are then all moved through the same distance, which implies that the pitch of all of the blades varies through the same angle.

In contrast, in order to apply cyclic pitch variation to the blades so as to direct the helicopter in a given direction, the pilot causes at least one servo-control to move by tilting the cyclic stick appropriately in the desired direction.

The cyclic swashplate then does not move vertically, but instead tilts relative to the mast of the main rotor. Each pitch control rod is thus moved as a function of the intended target so as to generate appropriate cyclic variation of the pitch of each blade.

Furthermore, the linkages are provided with at least one link rod and at least one crank means for connecting the pilot's flight controls to the servo-controls. In addition, provision may also be made for a phasing unit that enables the cyclic swashplate to tilt about two mutually perpendicular axes for use in heavy helicopters.

Similarly, the flight controls of a helicopter include a yaw control connected to a tail rotor by a yaw linkage that passes via the mixer.

The linkages are thus generally very long and heavy, particularly the yaw control linkage.

The members of the linkages give rise to friction forces that may be considerable for linkages of great length. Under such conditions the pilot may have difficulty in moving the cyclic stick or the collective pitch lever, given the amount of force required.

A first solution consists in using electric flight controls as suggested in document WO 2005/002963 or US 2007/0102588 (now U.S. Pat. No. 7,229,046). Nevertheless, that first solution is difficult to implement, in particular on existing rotorcraft.

Consequently, helicopter manufacturers have remedied the problem as posed by adding assistance systems that may be hydraulic or pneumatic. Known assistance systems consist in a block of actuators acting merely as a force-multiplying relay unit, with the block of actuators being arranged for example between bottom crank means and the mixer, for example.

Nevertheless, such assistance systems are bulky and heavy. Furthermore, they run the risk of hydraulic or pneumatic leakage, leading to a loss of effectiveness.

Finally, the gas in pneumatic assistance systems is sensitive to variations in temperature, unfortunately all too frequent in aviation, in particular because of operating at different altitudes, and the fluids used in hydraulic assistance systems possess polluting chemical compounds.

In addition, rotorcraft conventionally include an autopilot system for stabilizing the rotorcraft and/or for reducing the pilot's workload.

Fitting an autopilot system may possibly lead to "series" actuators being put into place in series in each linkage between a flight control and the controlled rotor.

The series actuators are intended for stabilizing the rotorcraft. Thus, the series actuators are generally very fast, but with little authority in amplitude.

Document EP 1 037 130 presents a "series" actuator suitable for being controlled by a computer to stabilize the machine.

A sensor sends information about an order given by a control stick to the computer. The computer then makes use of piloting relationships to control the series actuator in order to stabilize the helicopter.

Furthermore, an actuator known as a "parallel" actuator, or indeed as a "trim" actuator, is placed in parallel with each linkage.

Unlike series actuators, parallel actuators are controlled by autopilot means to control the movements of the helicopter. Thus, parallel actuators are generally slow, but have considerable authority in amplitude.

The autopilot controls the parallel actuators to maneuver the rotorcraft.

Furthermore, parallel actuators are used as anchors for series actuators. The autopilot continuously activates the series actuators in order to stabilize the rotorcraft. Without some additional action, the movements of the series actuators would be fed back to the pilot's flight controls.

By anchoring the associated flight controls, the parallel actuators prevent the movements of the series actuator from being fed back to the flight controls, e.g. the cyclic stick.

The parallel actuators also serve to anchor the flight controls.

In a first variant, a parallel actuator includes a motor suitable for moving an outlet shaft that is connected in parallel to a linkage. Between the motor and the outlet shaft, the parallel actuator is provided in particular with gearing, a spring box generating a determined force relationship, and a safety pin.

In another variant described in patent FR 2 708 112, the parallel actuator includes in particular in succession: a motor, a reversible gearing, a position sensor, a safety device, and an outlet shaft.

Control means activated by an autopilot then control the motor to generate a force relationship.

According to document US 2005/0173595 (now U.S. Pat. No. 7,108,232), the parallel actuator is an actuator suitable for generating a force relationship by being controlled by dedicated means.

Furthermore, dampers are provided in the linkages in order to stiffen the flight controls as a function of the speed at which the flight controls are moved.

Consequently, the state of the art includes rotorcraft having a piloting assistance device, provided in particular with a hydraulic block or with a plurality of series and parallel actuators.

Such a device is necessarily bulky, heavy, and expensive.

SUMMARY OF THE INVENTION

An object of the present invention is thus to propose a multipurpose piloting assistance device that enables the above-mentioned limitations to be overcome.

According to one embodiment of the invention, the device is used as a part of a method of assisting the piloting of a rotorcraft. The rotorcraft includes a flight control for controlling a rotor via at least one linkage, and is remarkable in that an additional force is generated using piloting assistance means mechanically linked to said at least one linkage, being arranged in parallel with said linkage, the additional force being a function of a setpoint force relating to the position of the flight control and a function of an instantaneous force as measured on the linkage.

Advantageously, the method is applied to each control linkage by placing piloting assistance means in parallel on each control linkage.

It should be observed that autopilot means may control the piloting assistance means to cause them to perform the functions of existing dampers and parallel actuators.

Thus, the invention makes it possible to use piloting assistance means to replace parallel actuators, dampers, and the hydraulic block implemented in the state of the art. It can be understood that this simplifies the architecture of flight controls and reduces their weight.

In addition, depending on the position of the control stick and on the measured instantaneous force, the piloting assistance means act on the linkage to facilitate the pilot's work, regardless of the amount of friction exerted on the linkage.

Unlike existing parallel actuators that are rather of a passive type using a torsion spring, thereby generating a force that is constant over time, the invention provides an active method that takes account of the force actually exerted on the linkage. Thus, even if the friction exerted on the linkage increases with increasing wear of the linkage, the pilot does not need to provide additional effort to counter it, since compensation is provided by the piloting assistance means.

One method of using the inventive device may also include performing one or more of the following steps:

measuring in real time an instantaneous force exerted on the linkage;

measuring the position of the flight control, e.g. a cyclic stick;

using at least one pre-established force relationship to determine a setpoint force that ought to be felt by the pilot operating the flight control when the flight control is at the measured position, and then determining the additional force to be equal to the difference between the setpoint force and the instantaneous force; and determining the setpoint electric current to deliver to the piloting assistance means in order to cause the piloting assistance means to generate the additional force, and then electrically powering the piloting assistance means in compliance with the setpoint current.

In addition, the pre-established force relationship is optionally changed as a function of flying conditions.

In a first variant, the pre-established force relationship is changed manually by the pilot, e.g. to go from a spring type force relationship to a friction type force relationship. Such a spring type force relationship possesses prestress associated with a force gradient having one or two slopes, whereas a friction type force relationship makes use of a constant force.

In a second variant, the pre-established force relationship is changed automatically by autopilot means.

Thus, it is possible to provide a force relationship that presents, in a graph plotting flight control position along the abscissa and force to be delivered up the ordinate:

the appearance of a straight line of shallow slope while the rotorcraft has a forward speed that is low, i.e. less than 50 knots for example (where 1 knot corresponds to 1.852 kilometers per hour); and the appearance of a straight line having a steep slope once the forward speed of the rotorcraft is large, i.e. greater than a threshold of 50 knots, for example.

In a third variant, for the piloting assistance means comprising at least one electric motor suitable for acting on the linkage to generate the additional force, the method comprises the steps of:

measuring the speed of rotation of the electric motor by differentiating the angular position of the electric motor; and changing the force relationship as a function of the speed of rotation.

By making these changes to the force relationship, it is possible to avoid implementing a damper in the linkage.

Furthermore, in a rotorcraft, there are numerous limits that the pilot needs to take account into at all times while flying.

Most presently-constructed helicopters are fitted with one or two turbine engines, with power being taken from a turbine, possibly mechanically independently from the compressor assembly of a free turbine engine. The free turbine of an engine rotates at 20,000 to 50,000 revolutions per minute, so a speed-reducing gearbox is needed for the connection to a rotor, since the rotor has a speed of rotation lying substantially in the range 200 to 400 revolutions per minute for a main lift rotor: this is known as the main gearbox (MGB).

The limits laid down by the manufacturer and that need to be taken into account by the pilot then include limits concerning the main gearbox and/or limits concerning the engine, e.g. a maximum duration for which the engine may be used at a particular speed.

Under such circumstances, in a fourth variant the force relationship is changed on reaching one of said limits, changing from a force relationship having a shallow slope to a force relationship having a steep slope. The pilot's flight control then appears stiffer. Thus, the pilot is informed that a limit has been reached in the power plant or in the main gearbox.

Furthermore, for piloting assistance means including a plurality of connection plugs suitable for receiving a plurality of different connectors of the rotorcraft, the method consists in the piloting assistance means determining said at least one force relationship as a function of which plugs are connected to a connector.

The same piloting assistance means may then be implemented on any linkage, thereby enabling said piloting assistance means to be standardized and thus reducing the fabrication and purchase costs of such piloting assistance means.

For example, the piloting assistance means may be connected to the electrical circuit of the rotorcraft via a plug provided with first, second, third, and fourth orifices.

Thus:

if the connector co-operates with the first orifice of said plug, the piloting assistance means deduce that they are connected to the roll linkage and make use of the pre-established force relationships appropriate for the roll linkage;

if the connector co-operates with the second orifice of said plug, the piloting assistance means deduce that they are connected to the pitch linkage and make use of the pre-established force relationships appropriate for the pitch linkage;

if the connector co-operates with the third orifice of said plug, the piloting assistance means deduce that they are connected to the collective linkage and make use of the pre-established force relationships appropriate for the collective linkage; and if the connector co-operates with the fourth orifice of said plug, the piloting assistance means deduce that they are connected to the yaw linkage and make use of the pre-established force relationships appropriate for the yaw linkage.

Advantageously, for the additional force being generated with the help of at least one brushless electric motor of the piloting assistance means, the method consists in disconnecting the electric motor as soon as its electricity consumption exceeds a predetermined operating threshold. Disconnection may be electrical or mechanical disconnection.

Excessive electricity consumption tends to indicate that the piloting assistance means are faulty. The electric motor is therefore disconnected from the linkage in order to avoid blocking it.

Furthermore, it is optionally possible to determine the setpoint electric current for supplying to the piloting assistance means by using broadband vector control.

The electric motor is then controlled as a function of a result that it is to achieve. Vector control via mathematical transformations enables the direction and the magnitude of the magnetic field to be controlled dynamically and thus enables the torque and the direction of rotation of the rotary member of the electric motor to be controlled, i.e. the drive rotor of the electric motor.

Use of broadband vector control enables torque to be controlled, while avoiding modulating the magnetic field so as to avoid the pilot feeling torque undulations.

Reference can be made to the literature to obtain more information on this topic.

Furthermore, for the rotorcraft including autopilot means suitable for controlling at least one series actuator in the linkage, the method includes the step of using the piloting assistance means to anchor the flight control dynamically when the autopilot means operate the series actuator.

Thus, an order given to the series actuator having the effect of stabilizing the rotorcraft does not influence the flight control. The pilot does not feel through the flight control the lengthening/shortening of the series actuator under the control of the autopilot means.

For example, by instructing the electric motor of the piloting assistance means to remain in a given position, the autopilot means anchor the flight control.

The invention thus enables flight controls to be anchored dynamically.

It should be observed that the force relationship of the piloting assistance means give rise in fact to the flight control being anchored mechanically in a manner that is static. Thus, mere contact with a flight control, e.g. as a result of the pilot's knee coming into contact with a stick, does not generate sufficient force to induce any movement in the associated linkage.

Nevertheless, it should be understood that it remains possible to anchor the flight controls mechanically by giving rise to relatively high levels of friction in appropriate sectors of the linkage.

In addition, for a rotorcraft including autopilot means, the piloting assistance means do not generate any additional force when under the control of the autopilot.

Since the pilot is not operating the pilot's control means, the piloting assistance means have no need to generate an additional force.

However, if the pilot operates the control means so as to modify the instantaneous force by a predetermined value, the method consists in disengaging the autopilot means so that the autopilot means no longer control the piloting assistance means.

When the pilot acts on the pilot's flight control, the instantaneous force increases or diminishes. The variation in this instantaneous force is thus detected immediately. Since the pilot has priority over the autopilot means, the autopilot means are then disengaged.

Furthermore, if the autopilot means is linked with at least one linkage for stabilizing the rotorcraft, then in an emergency mode, said autopilot means control the piloting assistance means to perform a stabilizing function via a specific engagement signal relating to a stabilization order.

Clearly, the associated flight control is no longer anchored by the piloting assistance means.

Furthermore, in order to verify proper operation of the linkage having the piloting assistance means arranged thereon, the method includes the steps of:

determining a force generated by said piloting assistance means using a pre-established electricity consumption relationship giving said generated force as a function of the electricity consumption of said piloting assistance means;

determining a real friction force equal to the difference between an instantaneous force exerted on said linkage as measured in real time and said generated force;

determining an ideal friction force for said linkage using a pre-established friction relationship; and signaling an anomaly when said real friction force exceeds said ideal friction force by a given threshold, e.g. once the real friction force is equal to twice said ideal friction force.

Furthermore, for said piloting assistance means including an electric motor controlled by control means, said control means are advantageously provided with a main computer unit and with a monitoring computer unit, each determining said additional force. The piloting assistance means are then deactivated if the additional force as determined by the main computer unit differs from the additional force as determined by said monitoring computer unit.

More precisely, the main computer unit controls the electric motor to generate the additional force, while the monitoring computer unit performs verification and deactivates the piloting assistance means, where appropriate.

The invention also provides piloting assistance means suitable for implementing the method of the invention, the piloting assistance means being provided with at least one electric motor controlled by control means, the electric motor being connected to an outlet shaft via gearing and fuse means in succession.

The fuse means then comprise:

a first wheel provided both with teeth on an outer periphery that co-operate with said gearing, and with driving teeth, said driving teeth being suitable for moving axially relative to said gearing;

driven teeth arranged on said outlet shaft, suitable for co-operating with said driving teeth; and a stationary electrical coil for attracting said driving teeth against said driven teeth when it is electrically powered by control means.

It should be observed that two configurations are possible:

either the driving teeth are secured to said first wheel, with said first wheel being suitable for moving axially relative to the gearing, e.g. via fluting;

or else the driving teeth are suitable for moving axially relative to the first wheel, e.g. via fluting.

Thus, the piloting assistance means enable the above-described method to be implemented and advantageously replace a hydraulic block, a parallel actuator, and a damper.

In addition, the piloting assistance means may include at least one first position sensor suitable for determining the angular position of the electric motor, and/or at least one second position sensor for sensing the position of the outlet shaft.

The first and second sensors both serve to determine the position of the flight control controlling the linkage fitted with the piloting assistance means.

In the event of the first sensor failing, the second sensor remains usable, and vice versa.

In addition, if the first and second sensors provide contradictory information, the control means are in a position to generate a warning. Each type of sensor has its own role, but comparing the information they transmit provides means for monitoring said equipment.

In addition, the first and second sensors are advantageously provided redundantly, the piloting assistance device then having two first sensors and two second sensors. The control means can then easily isolate a faulty sensor, i.e. a sensor giving information that does not correspond to the information provided by the other three sensors.

Finally, the invention also provides a device for assisting the piloting of a rotorcraft and suitable for implementing the method as described above, said rotorcraft being provided with a flight control for controlling a rotor via at least one linkage provided with a plurality of rods including at least one intermediate rod and link means. The device then comprises:

an instantaneous force sensor arranged in the intermediate rod;

determination means for determining the position of the flight control;

piloting assistance means of the invention having at least one electric motor controlled by control means to drive an outlet shaft connected directly or indirectly to the link means in parallel with the linkage, the piloting assistance means including at least a first position sensor suitable for determining the angular position of the electric motor, and/or at least a second position sensor for sensing the position of the outlet shaft.

The device of the invention thus limits the elements needed for assisting the pilot, thereby optimizing the weight of the device.

The piloting assistance means of the invention are fast, while having great authority. Consequently, they are perfectly capable of performing the function of a conventional series actuator.

Nevertheless, the piloting assistance device may optionally include at least one series actuator arranged between the rotor and the link means.

Furthermore, the piloting assistance device is optionally provided at least with autopilot means suitable for controlling the piloting assistance means and optionally the series actuator.

In addition, in order to anchor the flight control mechanically, the device is optionally provided with a friction unit arranged between the flight control and the series actuator in order to generate a friction force greater than the friction force of the linkage between the series actuator and the rotor, where appropriate between the series actuator and a servo-control.

Finally, for the rotorcraft being provided with at least two linkages, each provided with a plurality of rods including at least intermediate rod and link means, the piloting assistance device then includes:

an instantaneous force sensor arranged in said intermediate rod of each linkage; and a single piloting assistance means of the invention per linkage connected to the link means in parallel with the associated linkage.

Furthermore, for the electric motor being connected to an outlet shaft successively via gearing and fuse means, the fuse means comprise:

a first wheel provided both with teeth on an outer periphery that co-operate with the gearing, and with driving teeth on an inner periphery, the driving teeth being suitable for moving axially relative to the gearing;

driven teeth arranged on the outlet shaft, suitable for co-operating with the driving teeth; and a stationary electrical coil for attracting the driving teeth against the driven teeth when it is electrically powered by a control means.

BRIEF DESCRIPTION OF THE DRAWINGS

The invention and its advantages appear in greater detail from the following description of embodiments given by way of illustration with reference to the accompanying figures, in which.

Elements that are present in more than one of the figures are given the same references in each of them.

DETAILED DESCRIPTION OF THE PREFERRED EMBODIMENTS

Figure 1:
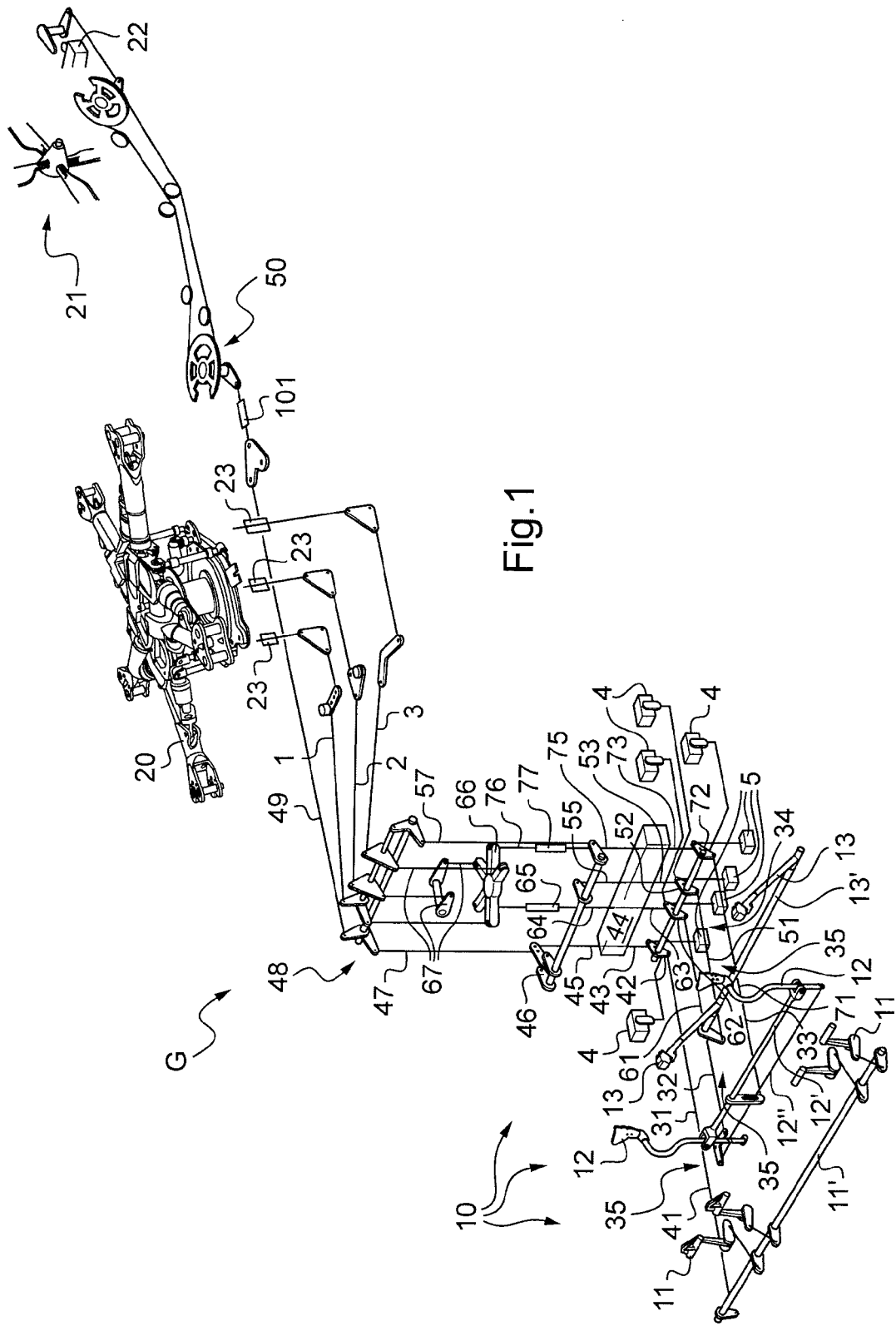
FIG. 1 is a view of a rotorcraft provided with a prior art piloting assistance device.

FIG. 1 is a view of a rotorcraft G having a prior art piloting assistance device.

The rotorcraft G has flight controls 10 connected to the main lift and advance rotor 20 and to the tail rotor 21 by linkages 35. In particular, the flight controls 10 comprise two sets of rudder pedals 11 for acting on the pitch of the blades of the tail rotor 21, together with two cyclic sticks 12 and two collective pitch levers 13 for modifying the pitch of the blades of the main lift rotor 20 and the pitch of the blades of the tail rotor 21.

In order to control the rotorcraft G in yaw, the rudder pedals 11 are connected together by a yaw jackshaft 11' controlling a servo-control 22 for modifying the pitch of the blades of the tail rotor 21 via a yaw linkage 31 that comprises in succession:

a bottom first rod 41;
crank means 42;
a second rod 43;
a hydraulic block 44;
a third rod 45;
collective pitch and yaw coupling means 46;
a fourth rod 47;
a mixer 48;
a fifth rod 49; and
a control system 50 having a control cable and pulleys, and a series stabilizer actuator 101 controlled by a computer of autopilot means.

Similarly, the collective pitch levers 13 are connected together by a collective pitch jackshaft 13', the collective pitch jackshaft 13' controlling the servo-controls 23 associated with the cyclic swashplates of the blades of the main rotor 20 via a collective linkage 34. This collective linkage 34 comprises in particular and in succession: a first rod 51, crank means 52, a second rod 53, a hydraulic block 44, a third rod 55, collective pitch and yaw coupling means 46, a fourth rod 57, a mixer 58, and first, second, and third top rods 1, 2, and 3.

In addition, the cyclic sticks 12 are connected together by a pitch jackshaft 12' and a roll jackshaft 12".

To control the rotorcraft G in roll, the bottom end of a cyclic stick 12 is connected to servo-controls 23 associated with the cyclic swashplates of the blades of the main rotor 20 via a roll linkage 32. The roll linkage 32 comprises in succession: a first rod 61, crank means 62, a second rod 63, a hydraulic block 44, a third rod 64 having a series stabilizer actuator 65 controlled by a computer of autopilot means, a phasing unit 66, three fifth rods 67, a mixer 48, and first, second, and third top rods 1, 2, and 3.

Finally, to control the rotorcraft G in pitch, the pitch jackshaft 12' is connected to servo-controls 23 associated with the cyclic swashplates for the main rotor blades 20 via a pitch linkage 33. This pitch linkage 33 comprises in succession: a first rod 71, crank means 72, a second rod 73, a hydraulic block 44, a third rod 75, a fourth rod 76 having a series stabilizer actuator 77 controlled by a computer of autopilot means, a phasing unit 66, three fifth rods 67, a mixer 48, and first, second, and third top rods 1, 2, and 3.

It should be observed that depending on requirements and safety, a plurality of series actuators may be arranged in a given linkage.

Finally, each linkage has a parallel actuator 4 and a damper 5.

Figure 2:
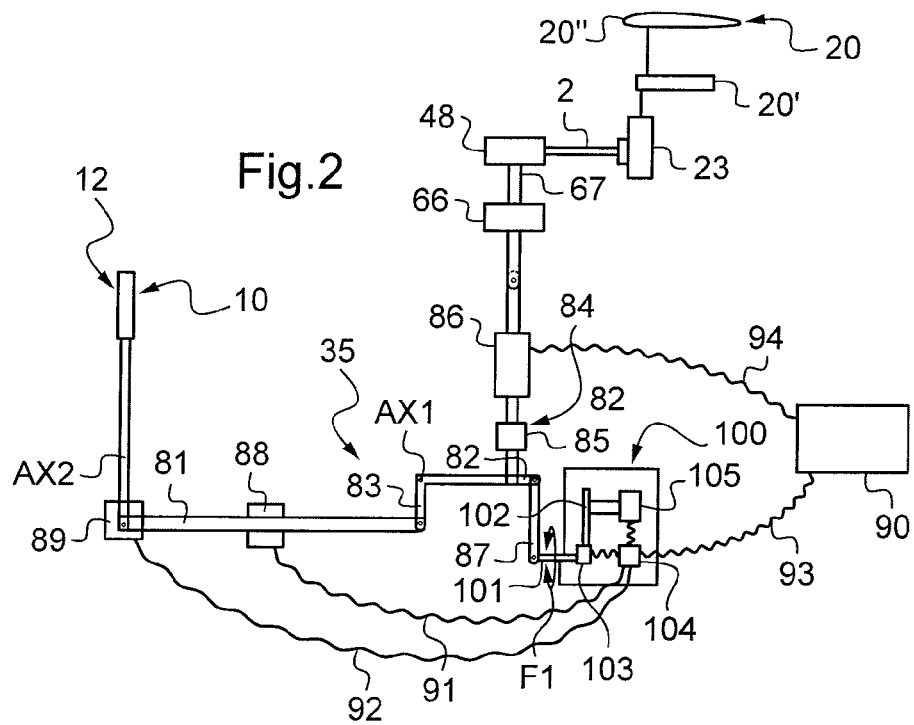
FIG. 2 is a diagram showing a piloting assistance device of the invention having rotary piloting assistance means.

FIG. 2 is a diagram showing a piloting assistance device of the invention fitted with piloting assistance means 100.

In order to modify the pitch of a blade of a rotorcraft rotor, the pilot uses a flight control 10 connected to a servo-control 23 by a linkage 35. The servo-control 23 then modifies the angle of inclination of a cyclic swashplate 20' so as to end up modifying the pitch of the corresponding blade 20 as required.

According to the invention, a single piloting assistance means 100 is arranged on each linkage, possibly associated with a series actuator 86. Consequently, and unlike the known state of the art, no use is made of a parallel actuator, nor of at least one series actuator and damper per linkage assisted by a hydraulic block, with use being made at most of a single piloting assistance means 100 and at least one series actuator 86.

For example, the cyclic stick 12 of the flight controls 10 is connected by a linkage 35, e.g. a pitch linkage, to a servo-control 23 suitable for controlling the cyclic swashplate 20'.

In order to connect the flight controls 10 to a servo-control 23, the linkage 35 then includes an intermediate rod 81, link means 82 suitable for performing rotary movement about a first fastener axis AX1, a secondary second rod 84 provided with friction means 85 and at least one series actuator 86, a phasing unit 66, a fourth rod 67, a mixer 48, and a top rod 2. It should be observed that the link means are provided with a first branch 83 hinged to the intermediate rod 81 and secured to a first free end of a second branch 82 of the link means, the second branch 82 being hinged to the secondary second rod 84.

Optionally, the link means may include a triangular member, with two sides of the triangular member being secured to the first and second branches to form triangular link means.

In addition, the piloting assistance device includes piloting assistance means 100 arranged in parallel with the linkage 35, being hinged to a second free end of the second branch 82 of the link means, either directly or via a link rod 87.

Under such circumstances, the piloting assistance device is provided with an instantaneous force sensor 88 secured to the intermediate rod 81. For example, an instrumented rod is used that has at least one conventional strain gauge type force sensor, possibly implementing a Weston bridge.

In a variant, it is possible to envisage providing a movement sensor that measures a deformation.

In addition, a single sensor may not be sufficiently reliable, depending on the safety constraints that need to be satisfied, so the instrumented rod may have three instantaneous force sensors 88. Using two sensors would not be any more satisfactory, a priori, insofar as it would be difficult to determine which sensor is faulty in the event of the sensors not agreeing.

The instantaneous force sensor then delivers first information in real time over a first wire connection 91 relating to the instantaneous force exerted on the linkage 35 to control means 104 of the piloting assistance means.

Additionally, the piloting assistance device possesses determination means 89 for determining the position of the flight control.

In FIG. 2, the determination means 89 comprise an angle sensor, e.g. arranged at the bottom end of the control means. The angle sensor sends second information in real time over a second wire connection 92 to the control means 104 of the piloting assistance means.

Below, it is explained that in a variant the means 89 for determining the position of the flight control 10 may be incorporated in the piloting assistance means 100.

Finally, FIG. 2 shows autopilot means suitable for controlling the control means 104 of the piloting assistance means 100 and the series actuator 86, respectively via third and fourth wire connections 93 and 94.

Thus, depending on requirements, the control means 104 instruct the electric motor 105 to turn. This motor acts via gearing 102 and fuse means 103 to turn an outlet shaft 101. The outlet shaft 101 turns as represented by double-headed arrow F1 giving rise to movement in translation of the link rod 87 along its longitudinal axis followed by tilting of the second branch 82 of the link means about its first pivot axis AX1.

Figure 3:
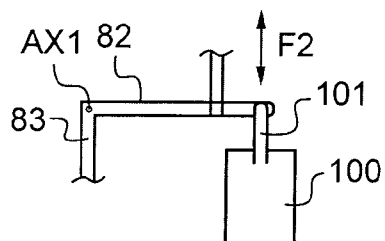
FIG. 3 is a diagram showing a piloting assistance device of the invention having linear piloting assistance means.

With reference to FIG. 3, in another embodiment, the piloting assistance means comprise linear piloting assistance means.

The electric motor 105 in the piloting assistance means does not give rise to rotation but rather to movement in translation of the outlet shaft 101 along its extension/retraction axis, as represented by double-headed arrow F2.

There is then no need to have a link rod between the outlet shaft and the second branch 82.

Independently of the variant implemented, depending on the instantaneous force as measured by the instantaneous force sensor 88 and depending on the position of the flight control as determined by the determination means 89, the control means 104 of the piloting assistance means 100 generate an additional force on the linkage 35 by moving the second branch 82.

Depending on requirements, the piloting assistance means block the flight control by generating a complementary force that opposes or assists the pilot in moving the linkage.

For example, if the flight control and the piloting assistance means both tend to generate turning of the link means about the first fastener axis in the same direction, then the additional force tends to assist the pilot.

In contrast, if the flight control and the piloting assistance means tend to generate pivoting of the second branch of the link means about the first fastener axis in opposite directions, then the additional force is an opposing additional force that tends to block the flight control.

Furthermore, when the autopilot means 90 cause the series actuator to lengthen or shorten, the piloting assistance means compensate the movement generated by the series actuator via its servo-control logic in order to anchor the flight control.

In addition, when the autopilot 90 is activated, the autopilot means 90 control the piloting assistance means 100, taking the place of the pilot. Consequently, there is no need to generate an additional force in order to assist the pilot.

In contrast, as soon as the pilot takes back control of the flight control 10, the autopilot means are automatically deactivated.

More precisely, by moving the flight control 10, the pilot will significantly increase or decrease the instantaneous force measured by the instantaneous force sensor 88. As soon as the control means 104 receive an instantaneous force variation that is greater than or equal to a predetermined threshold, the control means 104 request disengagement of the autopilot means 90.

Furthermore, when the autopilot means 90 cause the series actuator to lengthen or shorten, the piloting assistance means 100 automatically anchor the flight control 10. The movements of the series actuator 86 therefore do not give rise to parasitic movements of the flight control.

It should be observed that the piloting assistance means may anchor the flight control mechanically and in static manner.

It suffices for the coefficient of friction between two moving members of the piloting assistance means 100, e.g. between the gearing and the electric motor 105, to be greater than the coefficient of friction of the elements of the linkage extending between the series actuator 86 and the inlet of the servo-control 23.

In a non-essential variant, and with reference to FIG. 2, provision may be made for a friction unit 85 to be provided that is dedicated to this purpose between the series actuator 86 and the flight control 10, e.g. on the secondary second rod 84.

Figure 4:
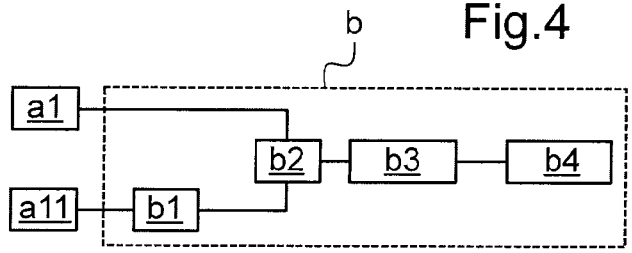
FIG. 4 is a diagram explaining the method of the invention.

FIG. 4 is a diagram for explaining the method of the invention in greater detail.

In a step a1), performed in real time, the instantaneous force being supported by the linkage 35 is measured using the instantaneous force sensor 88.

During a step a11), in parallel with the step a1), the position of the flight control 10 is measured in real time using the position determination means 89.

Finally, during a step b), an additional force is generated as a function of the measured instantaneous force and the measured position of the flight control 10.

Advantageously, during a step b1), the control means 104 determine a setpoint force for application to the linkage appropriate for the position of the flight control 10 as measured during step a11).

For this purpose, the control means 104 rely on a pre-established force relationship. Specifically, the force relationship is given by a curve in a graph plotting position of the flight control along the abscissa and setpoint force up the ordinate.

Such a force relationship may correspond in particular to the force relationship induced by the torsion springs used in the state of the art.

In a variant of the invention, the control means 104 have a plurality of force relationships available. Thus, the control means 104 are in a position to determine automatically the force relationship that should be used as a function of predetermined rules, possibly relating to flying conditions.

For example, the control means 104 determine the linkage 35 with which they are associated and they select the predetermined force relationship(s) to correspond with that linkage.

For this purpose, for each connector for connecting to a batch of plugs of the piloting assistance means 100, the control means 104 optionally determine the particular connector via which it is connected to the electrical circuit of the rotorcraft, by determining which batch of plugs is involved. Depending on the connector in use, the control means then determine the pertinent force relationship(s).

In addition, the control means 104 pass from a force relationship having a shallow slope to a force relationship having a steep slope, and vice versa, as a function of the rate at which the flight control 10 is moved. The control means 104 determine the speed of rotation of the electric motor 105 by differentiating the angular position of the electric motor as obtained via a first sensor for sensing the angular position of the electric motor. Depending on the speed of rotation obtained in this way, the control means 104 change the force relationship.

Under such circumstances, the piloting assistance means 100 may favorably replace the dampers used in the known state of the art.

In the same way, the control means 104 may select a force relationship having a very steep slope so that the piloting assistance means perform the function of a dynamic abutment. Consequently, the additional force provided by the piloting assistance means 100 is an opposing additional force that tends to prevent the pilot from moving the flight control.

In another variant, the pilot may instruct a changeover from one force relationship to another by using dedicated selector means.

During a step b2) in step b), the control means 104 determine an additional force to be supplied, the additional force being equal to the difference between the setpoint force and the instantaneous force.

Thereafter, during a step b3) of step b), and using a conversion table, the control means 104 determine the setpoint current for application to the electric motor 105, and the direction of rotation of the electric motor 105, so that the piloting assistance means 100 can generate the required additional force. A method that implements broadband vector control is advantageously used.

Finally, during a step b4), the control means 104 feed the electric motor with electricity at the setpoint current.

Furthermore, it is advantageous for the control means 104 to monitor electricity consumption by the electric motor 105. If the control means 104 detect excess consumption, then the control means 104 instruct fuse means 103 to separate the piloting assistance means 100 from the linkage, by separating the electric motor 105 from the outlet shaft 101. The control means 104 may signal a fault to a rotorcraft monitor member.

Figure 5:
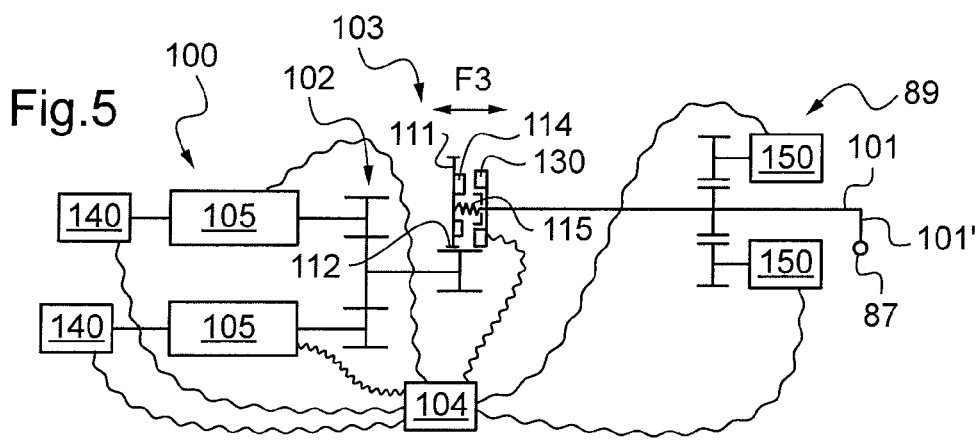
FIG. 5 is a diagram explaining the piloting assistance means.

FIG. 5 is a diagram showing piloting assistance means 100 having two electric motors 105 for safety reasons.

In normal operation, the electric motors drive the gearing 102 together, each delivering an equal share. In contrast, in the event of one of the electric motors 105 breaking down, the gearing 102 is driven by the still-working electric motor 105.

Under drive from the electric motors 105, the gearing 102 is suitable for rotating fuse means 103 secured to the outlet shaft 101.

The free end of the outlet shaft 101 then turns a crank 101' hinged to a link rod 87.

In addition, the piloting assistance means 100 have one conventional first position sensor 140 per electric motor. The first position sensors 140 deliver information about the angular positions of their associated electric motors to the control means 104, e.g. an electronics card.

Furthermore, the piloting assistance means 100 are provided with at least one second position sensor 150 for sensing the position of the outlet shaft 101. The second position sensors 150 deliver information about the angular position of the outlet shaft 101.

The first and second position sensors thus form portions of the means 89 for determining the position of the flight control 10.

By way of example, such a variant serves to avoid implementing an angle sensor on the flight control, unlike the version shown in FIG. 2.

Figure 6:
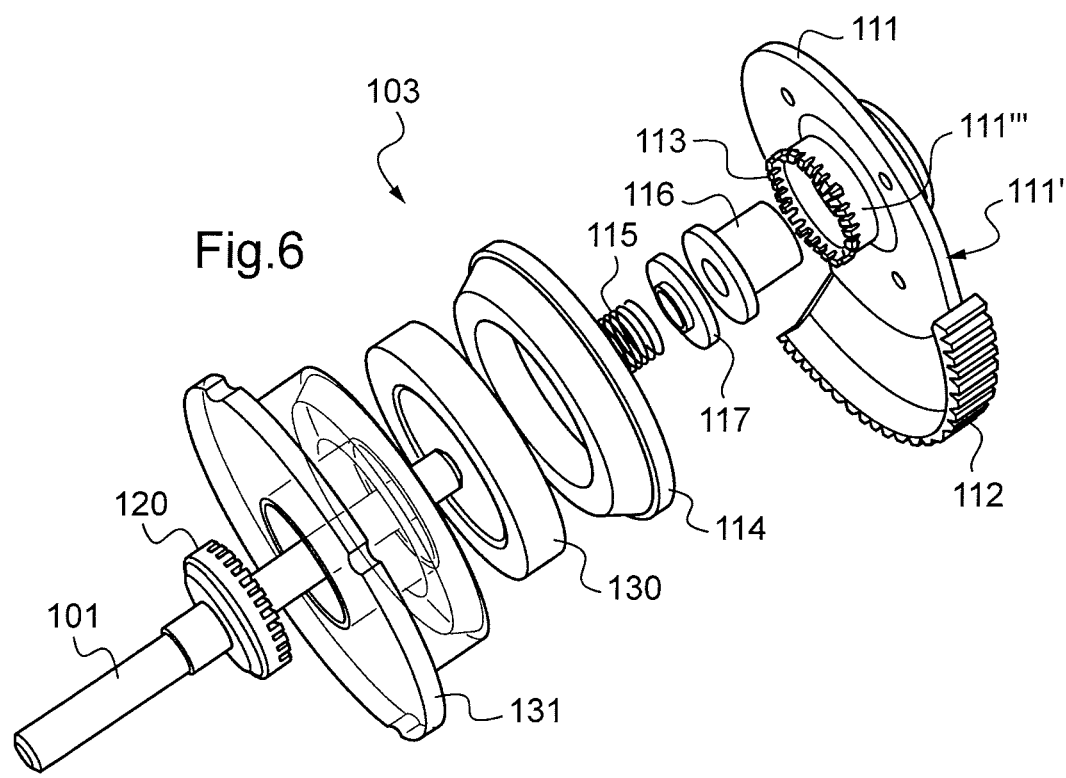
FIG. 6 is an exploded view of the fuse means of the piloting assistance means.
Figure 7:
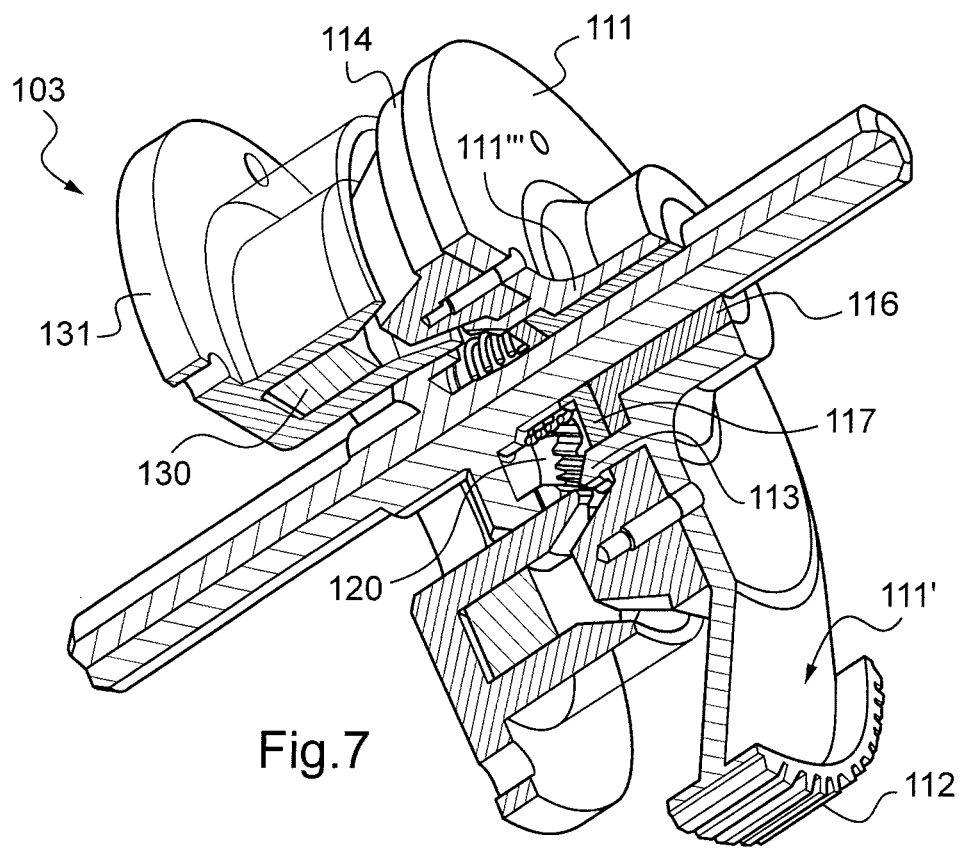
FIG. 7 is an isometric view of the piloting assistance means.

Furthermore, with reference to FIGS. 5 to 7, the fuse means 103 is provided with a first wheel 111 having a set of teeth 112 on its outer periphery 111'. The teeth 112 of the first wheel then co-operate with the gearing 102 via fluting.

Furthermore, the inner periphery 111" of the first wheel 111 is secured to a crown of driving teeth 113. A ferric plate 114 is secured to the first wheel 111 by being arranged between the inner and outer peripheries 111" and 111' of the first wheel 111.

In addition, the fuse means 103 possess a crown of driven teeth 120 secured to the outlet shaft 101. A support 131 is then secured to the driven teeth so as to support an electric coil 130 controlled by the control means 104.

A bearing 116, a friction washer 117, and a spring 115 are then arranged around the outlet shaft between the driving and driven teeth 113 and 120.

Under such conditions, the spring tends to move the driving teeth 113 away from the driven teeth 120 so as to separate the first wheel 111, and thus the electric motors 105, from the outlet shaft 101.

In the configuration shown, the first wheel 111 moves along the fluting of the gearing.

In an alternative configuration, the driving teeth are connected to the inner portion of the first wheel via fluting. The ferric plate is then secured to the driving teeth and not to the first wheel, with it then being possible for the driving teeth to move axially relative to the first wheel.

In contrast, when the control means 104 power the coil 130 electrically, the coil 130 generates a magnetic field that attracts the first wheel 111 towards the coil 130 in spite of the opposing force from the spring 115. The first wheel 111 moves along the outlet shaft while remaining constrained to rotate with the gearing 102, until the driving teeth 113 mesh with the driven teeth 120.

Finally, the control means 104 are advantageously provided with a main computer unit for controlling at least one electric motor and with a monitoring computer unit, these computer units comprising microprocessors, for example.

The main computer unit performs multiple operations for delivering orders to control the various members of the piloting assistance means. The monitoring computer unit then performs the same operations as the main computer unit and verifies that it obtains the same results. In the event of disagreement, the monitoring computer unit deactivates the piloting assistance means and informs the pilot.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A piloting assistance device for assisting the piloting of a rotorcraft, the rotorcraft being provided with a flight control for controlling a rotor via at least one linkage provided with a plurality of rods including at least intermediate rod and link means, wherein the device comprises:
    an instantaneous force sensor secured to an intermediate rod;
    determination means for determining a position of the flight control; and
    piloting assistance means having at least one electric motor controlled by control means to drive an outlet shaft connected to the link means in parallel with the at least one linkage, the piloting assistance means including at least one of
    an electric motor position sensor for determining an angular position of the at least one electric motor, and
    an outlet shaft position sensor for sensing a position of the outlet shaft.

2. A piloting assistance device according to claim 1, further including at least one autopilot means for controlling the piloting assistance means.

3. A piloting assistance device according to claim 1, further including a friction unit arranged between the control means and a series actuator to generate a friction force greater than the friction force of a linkage between the series actuator and the rotor.

4. A piloting assistance device according to claim 1, wherein the rotorcraft is provided with at least two linkages, each having a plurality of rods including at least one intermediate rod and link means, the piloting assistance device further comprising
    one instantaneous force sensor arranged in the intermediate rod of an associated linkage; and
    a single piloting assistance means per linkage that is connected to the link means in parallel with the associated linkage.

5. A piloting assistance device according to claim 1, wherein the electric motor is connected to an outlet shaft successively via gearing and fuse means, the fuse means comprising
    a first wheel provided with teeth on an outer periphery that co-operate with the gearing and with driving teeth on an inner periphery, the driving teeth moving axially relative to the gearing;
    driven teeth arranged on the outlet shaft for co-operating with the driving teeth; and
    a stationary electrical coil for attracting the driving teeth against the driven teeth when the coil is electrically powered by the control means.

6. A piloting assistance device according to claim 1, wherein the piloting assistance means commands an additional force in response to the difference between a setpoint force and a measured instantaneous force.

7. A piloting assistance device according to claim 6, wherein the setpoint force is determined in response to a pre-established force relationship.

8. A piloting assistance device according to claim 7, wherein the pre-established force relationship varies as a function of flying conditions.

9. A piloting assistance device according to claim 1, wherein the instantaneous force sensor is an electronic sensor.

10. A piloting assistance device according to claim 1, wherein the instantaneous force sensor is a strain gauge type force sensor.

11. A piloting assistance device according to claim 1, wherein the instrumentation means is an angle sensor connected to the flight control.

12. A piloting assistance device for assisting the piloting of a rotorcraft, the rotorcraft being provided with a flight control for controlling a rotor via at least one linkage provided with a plurality of rods including at least intermediate rod and link means, wherein the device comprises:
    an instantaneous force sensor arranged in an intermediate rod;
    determination means for determining a position of the flight control; and
    piloting assistance means having at least one electric motor controlled by control means to drive an outlet shaft connected to the link means in parallel with the at least one linkage, the piloting assistance means including
        at least a first position sensor for determining an angular position of the at least one electric motor, and
        at least a second position sensor for sensing a position of the outlet shaft.

13. A piloting assistance device according to claim 12, wherein the piloting assistance means commands an additional force in response to the difference between a setpoint force and a measured instantaneous force.

14. A piloting assistance device according to claim 13, wherein the setpoint force is determined in response to a pre-established force relationship.

15. A piloting assistance device according to claim 14, wherein the pre-established force relationship varies as a function of flying conditions.

16. A piloting assistance device for assisting the piloting of a rotorcraft, the rotorcraft being provided with a flight control for controlling a rotor via at least one linkage provided with a plurality of rods including at least intermediate rod and link means, wherein the device comprises:
    an instantaneous force sensor arranged in an intermediate rod;
    determination means for determining a position of the flight control; and
    piloting assistance means having at least one electric motor controlled by control means to drive an outlet shaft connected to the link means in parallel with the at least one linkage, the piloting assistance means including
        a position sensor selected from the group consisting of an electric motor position sensor for determining an angular position of the at least one electric motor and an outlet shaft position sensor for sensing a position of the outlet shaft.

17. A piloting assistance device according to claim 16, wherein the piloting assistance means commands an additional force in response to the difference between a setpoint force and a measured instantaneous force.

18. A piloting assistance device according to claim 17, wherein the setpoint force is determined in response to a pre-established force relationship.

19. A piloting assistance device according to claim 18, wherein the pre-established force relationship varies as a function of flying conditions.

20. A piloting assistance device according to claim 16, wherein the instantaneous force sensor is an electronic sensor.

* * * * *